United States Patent
Son et al.

(10) Patent No.: US 8,626,108 B2
(45) Date of Patent: Jan. 7, 2014

(54) APPARATUS AND METHOD FOR CONTROLLING SLEEP CYCLE SYNCHRONIZATION FOR EMERGENCY ALERT SERVICE IN WIRELESS COMMUNICATION SYSTEM

(75) Inventors: Yeong-Moon Son, Yongin-si (KR); Hyun-Jeong Kang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 115 days.

(21) Appl. No.: 13/280,115

(22) Filed: Oct. 24, 2011

(65) Prior Publication Data
US 2012/0100881 A1    Apr. 26, 2012

(30) Foreign Application Priority Data
Oct. 25, 2010    (KR) ........................ 10-2010-0104115

(51) Int. Cl.
*H04B 1/16*      (2006.01)
*H04K 3/00*      (2006.01)

(52) U.S. Cl.
USPC ........................................ 455/343.1; 370/311

(58) Field of Classification Search
USPC .............. 455/343.1–343.3; 370/311
See application file for complete search history.

(56) References Cited

U.S. PATENT DOCUMENTS

2009/0186595 A1\*    7/2009    Son et al. .................... 455/404.1
2010/0254293 A1\*    10/2010    Son et al. ...................... 370/311

FOREIGN PATENT DOCUMENTS

| KR | 2006-0027030 | 3/2006 |
| KR | 2008-0058701 | 6/2008 |
| KR | 2009-0079471 | 7/2009 |
| KR | 2010-0111236 | 10/2010 |

OTHER PUBLICATIONS

International Search Report dated May 30, 2012 in connection with International Patent Application No. PCT/KR2011/007979.
Written Opinion of International Searching Authority dated May 30, 2012 in connection with International Patent Application No. PCT/KR2011/007979.

\* cited by examiner

*Primary Examiner* — Lee Nguyen

(57) ABSTRACT

A method operates a Mobile Station (MS) in a sleep mode state in a wireless communication system. The method includes transmitting a request message to a Base Station (BS) to inquire a location of a next scheduled listening window responsive to failing to receive a traffic indication message and unicast data during a listening window, receiving a response message unicast in response to the request message, performing sleep cycle synchronization by using synchronization information included in the response message, and determining whether an emergency alert service-related message is transmitted by using emergency alert service-related information included in the response message.

30 Claims, 7 Drawing Sheets

APPARATUS AND METHOD FOR CONTROLLING SLEEP CYCLE SYNCHRONIZATION FOR EMERGENCY ALERT SERVICE IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Oct. 25, 2010 and assigned Serial No. 10-2010-0104115, the entire disclosure of which is hereby incorporated by reference,

TECHNICAL FIELD OF THE INVENTION

The present invention relates generally to a Broadband Wireless Access (BWA) system, and in particular, to an apparatus and method for controlling sleep cycle synchronization to support an emergency alert service in a BWA system.

BACKGROUND OF THE INVENTION

Extensive research is being conducted to provide various Quality of Service (QoS) features with high data rates in the advanced fourth-generation (4G) communication systems. The 4G communication systems are evolving to provide high mobility and QoS features in wireless communication systems such as Local Area Network (LAN) systems and Metropolitan Area Network (MAN) systems.

In general, because wireless communication systems consider the mobility of a Mobile Station (MS), the power consumption of the MS is evaluated as a key performance index of the entire system. Thus, a wireless communication system standard such as Institute of Electrical and Electronics Engineers (IEEE) 802.16 defines an active mode and a sleep mode of an MS to minimize the power consumption of the MS.

FIGS. 1A and 1B illustrate a sleep mode operation defined in the conventional IEEE 802.16 system.

Referring to FIG. 1A, an MS receives a mode transition allowance from a Base Station (BS) to transition to a sleep mode in the IEEE 802.16e system. Herein, the BS may buffer or drop packet data to be transmitted, while allowing the transition of the MS to the sleep mode. Also, during a listening window or a listening interval of the MS, the BS informs the MS whether there are data to be transmitted to the MS, and the MS wakes up from the sleep mode and determines whether there are data to be transmitted to the MS. In FIGS. 1A and 1B, TRF-IND (MOBile TRaFfic INDicator (MOB_TRF-IND) messages 100, 102 and 104 are transmitted to inform whether there are packet data to be transmitted. Herein, the TRF-IND messages 100 and 102 containing 'Negative Traffic Indication' indicate the absence of packet data, and the TRF-IND message 104 containing 'Positive Traffic Indication' indicates the presence of packet data.

If it is determined during the listening interval or the listening window that there are data to be transmitted to the MS, the MS transitions to the active mode and receives data from the BS. Thereafter, in order to transition from the active mode to the sleep mode, the MS transmits/receives SleeP-REQuest/ReSPonse (SLP-REQ/RSP) to/from the BS. This may cause a signaling overhead.

In order to prevent the signaling overhead, the MS may not transition to the active mode even in the case of presence of traffic, as illustrated in FIG. 1B. In other words, there is a limitation in that the transition between the active mode and the sleep mode must be made by MOBile SLeeP-REQuest/ReSPonse (MOB_SLP-REQ/RSP) signaling. Accordingly, during the sleep mode, the MS repeats a sleep state and an awake state in a sleep cycle and receives data.

Referring to FIG. 1B, during the listening window or the listening interval in a sleep state, the MS receives TRF-IND messages 100, 102, 104, 110 and 112 from the BS. Specifically, the MS receives the TRF-IND message 100 containing 'Negative Traffic Indication' during the listening window in the initial sleep cycle and increases the next sleep cycle by two times. After the lapse of the next sleep cycle, the MS receives the TRF-IND message 102 containing 'Negative Traffic Indication' and sets the next sleep cycle to two times the current sleep cycle. After the lapse of the sleep cycle, the MS receives the TRF-IND message 104 containing 'Positive Traffic Indication', receives downlink data during the listening window for the TRF-IND message 104, and resets the next sleep cycle to the length of the initial sleep cycle. Thereafter, during the listening window after the lapse of the initial sleep cycle, the MS receives the TRF-IND message 110 containing 'Negative Traffic Indication' and increases the sleep cycle by two times. Thereafter, during the listening window after the lapse of the increased sleep cycle, the MS receives the TRF-IND message 112 containing 'Negative Traffic Indication' and again increases the sleep cycle by two times.

If the MS normally receives the traffic indication information through the TRF-IND message transmitted by the BS, sleep cycle synchronization is maintained between the MS and the BS. On the other hand, if the MS fails to receive the TRF-IND message due to channel state degradation, the MS cannot know whether the BS has transmitted 'Positive Traffic Indication' or 'Negative Traffic Indication'. Consequently, the MS cannot correctly set the length of the next sleep cycle. This causes sleep cycle desynchronization between the MS and the BS.

FIG. 2 illustrates sleep cycle desynchronization in the conventional IEEE 802.16 system.

Referring to FIG. 2, an MS normally receives TRF-IND (MOB_TRF-IND) messages 200 and 202 containing 'Negative Traffic Indication' during the listening window of a sleep cycle, and fails to receive a TRF-IND message 204 containing 'Negative Traffic Indication' during the listening window after the lapse of the next sleep cycle. Herein, a BS recognizes the listening window of the next sleep cycle as a time point t1 (212). However, because the MS has failed to receive the TRF-IND message 204, the MS cannot determine whether to reset the next sleep cycle to the initial sleep cycle according to 'Positive Traffic Indication' or to increase the next sleep cycle by two times according to 'Negative Traffic Indication'. The start time point of a listening window of an actual sleep cycle is the time point t1 (212). However, if the MS resets the next sleep cycle to the initial sleep cycle, it causes desynchronization of the listening window of a sleep cycle. Thus, sleep cycle desynchronization may occur if the MS fails to receive the TRF-IND message in the wireless communication system.

In order to solve the problem of sleep cycle desynchronization, the MS transmits a TRF-IND request message to the BS if the MS fails to receive not only the TRF-IND message but also downlink traffic until the end of the listening window. For example, the TRF-IND request message may be an AAI (Advanced Air Interface)_TRF-IND-REQ message shown in Table 1 below.

TABLE 1

| Field | Size (bit) | Value/Description |
|---|---|---|
| AAI-TRF_IND-REQ message_format( ) { | | |
| Control Message Type | 8 | This indicates type of control message is AAI-TRF_IND-REQ message |

When receiving the TRF-IND-REQ message shown in Table 1, the BS transmits a TRF-IND-RSP message to the MS on the basis of 'Positive Traffic Indication' or 'Negative Traffic Indication' that is a traffic indication given to the MS through the AAI_TRF-IND message. For example, the TRF-IND-RSP message may be an AAI_TRF-IND-RSP message shown in Table 2 below.

TABLE 2

| Field | Size (bit) | Value/Description |
|---|---|---|
| AAI-TRF_IND-RSP message_format( ) { | | |
| Frame_Number | 10 | The least significant 10 bits of the frame number in which incoming LW will start 0~1023 |
| Sleep Cycle Length | 10 | The length of sleep Cycle which contains the next scheduled Listening Window. If the AMS receives the negative traffic indication during a the next scheduled Listening Window, the (current) Sleep Cycle shall be set to this value at that time. Value: 0~1023 Sleep Cycle Length = Value + 1 |

As can be seen from the AAI_TRF-IND-RSP message of Table 2, the BS notifies the MS of the frame number for a next scheduled listening window. Also, if 'Negative Traffic Indication' occurs in the listening window of the notified frame number, the BS notifies the length of a doubled sleep cycle.

For reference, a sleep cycle includes a listening window and a sleep window. The listening window is located at the front of the sleep cycle. Thus, if 'Positive Traffic Indication' is received in the current listening window, the current sleep cycle including the current listening window is reset to the initial sleep cycle size. Accordingly, the next scheduled listening window starts at a relatively near point, that is, the current sleep cycle is immediately after the initial sleep cycle. On the other hand, if 'Negative Traffic Indication' is received, the current sleep cycle increases by two times the previous sleep cycle. Accordingly, the next scheduled listening window starts at a relatively distant point.

The TRF-IND message may contain emergency alert information, an example of which is shown in Table 3 below.

TABLE 3

| Field | Size (bit) | Value/Description |
|---|---|---|
| Emergency Alert Indication | 1 | Used to indicate the presence of emergency information for supporting the emergency alert service 0b0: there is no emergency information 0b1: there is emergency information |

When an emergency alert indication of Table 3 is set to 1, it means that an emergency alert service-related message will be transmitted. That is, when the emergency alert indication is set to 1, it means that the MS does not enter the sleep state in the sleep window but maintains the awake state to receive an emergency alert service-related message.

As described above, an emergency alert service is considered in the TRF-IND message, whereas an emergency alert service is not considered in the exchange of the TRF-IND-REQ/RSP messages. In other words, if the MS loses the TRF-IND message, the MS can only inquire of the BS what the MS's traffic indicator is, but cannot determine whether there is an emergency alert service-related message.

SUMMARY OF THE INVENTION

To address the above-discussed deficiencies of the prior art, it is a primary aspect of the present disclosure is to provide an apparatus and method for controlling desynchronization caused by the non-reception of a TRF-IND message in a BWA system.

Another aspect of the present disclosure is to provide an apparatus and method for controlling desynchronization on the basis of information about the reception/non-reception of downlink traffic in the case of non-reception of a TRF-IND message in a BWA system.

Another aspect of the present disclosure is to provide an apparatus and method for controlling desynchronization through a separate control message in the case of non-reception of a TRF-IND message in a BWA system.

Another aspect of the present disclosure is to provide an apparatus and method for obtaining emergency alert service-related information through a separate control message in the case of non-reception of a TRF-IND message in a BWA system.

According to an aspect of the present disclosure, a method for operating a Mobile Station (MS) in a sleep mode state in a wireless communication system includes: if failing to receive a traffic indication message and unicast data during a listening window, transmitting a request message to a Base Station (BS) to inquire a location of a next scheduled listening window; receiving a response message that is unicasted in response to the request message; performing sleep cycle synchronization by using synchronization information included in the response message; and determining whether an emergency alert service-related message is transmitted by using emergency alert service-related information included in the response message.

According to another aspect of the present disclosure, a method for operating a Base Station (BS) in a wireless communication system includes: transmitting downlink traffic and a traffic indication message including at least one Mobile Station (MS) identifier during a listening window of at least one MS; receiving a request message to inquire a location of a next scheduled listening window, from an MS failing to receive a traffic indication message and unicast data during a listening window; and responding to the request message of the MS by unicasting a response message including synchronization information and emergency alert service-related information to the MS.

According to another aspect of the present disclosure, an apparatus of a Mobile Station (MS) in a wireless communication system includes: a modem for transmitting, if failing to receive a traffic indication message and unicast data during a listening window, a request message to a Base Station (BS) to inquire a location of a next scheduled listening window, and receiving a response message that is unicasted in response to the request message; and a controller for performing sleep cycle synchronization by using synchronization information included in the response message, and determining whether an emergency alert service-related message is transmitted by using emergency alert service-related information included in the response message.

According to another aspect of the present disclosure, an apparatus of a Base Station (BS) in a wireless communication system includes: a modem for transmitting downlink traffic and a traffic indication message including at least one Mobile Station (MS) identifier during a listening window of at least one MS, and receiving a request message to inquire a location of a next scheduled listening window, from an MS failing to receive a traffic indication message and unicast data during a listening window; and a controller for responding to the request message of the MS by unicasting a response message including synchronization information and emergency alert service-related information to the MS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
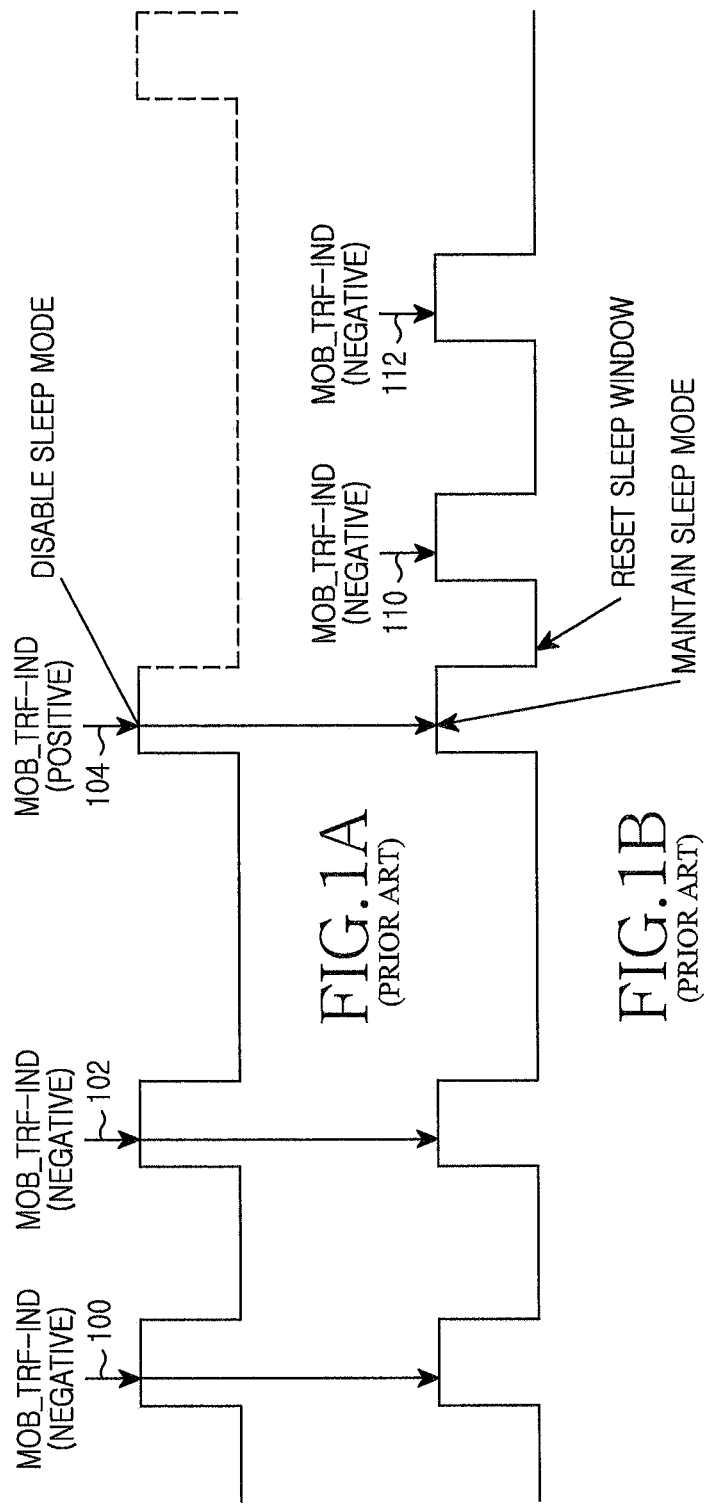
FIGS. 1A and 1B illustrate a sleep mode operation defined in the conventional IEEE 802.16 system.
Figure 2:
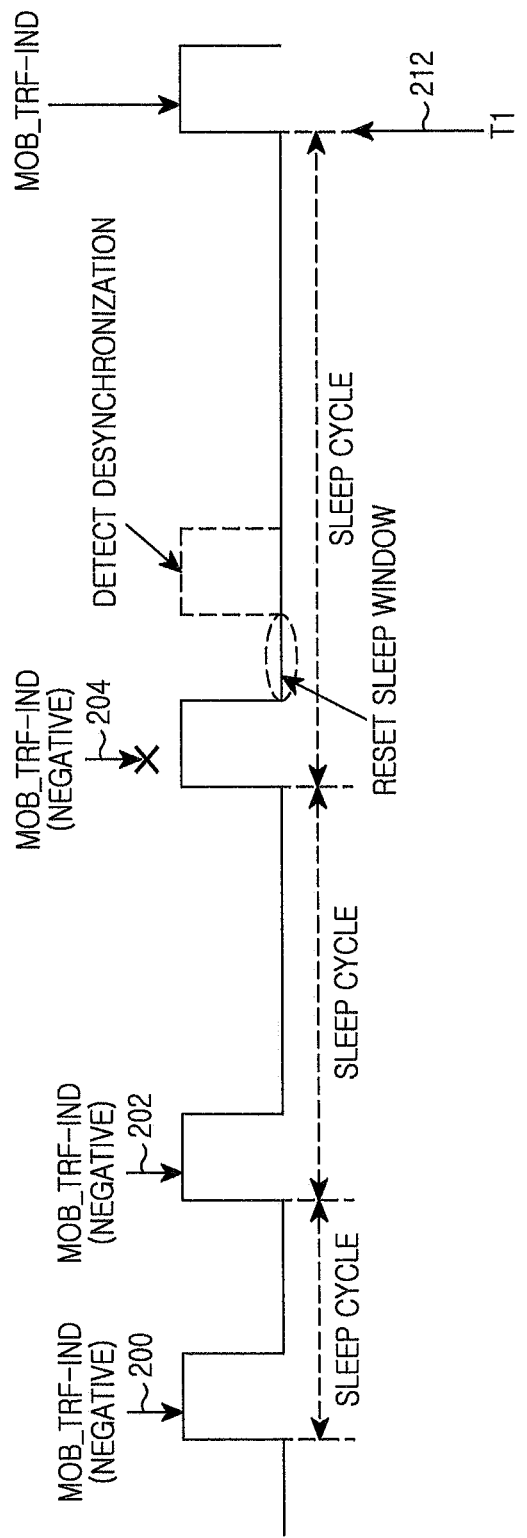
FIG. 2 illustrates sleep cycle desynchronization in the conventional IEEE 802.16 system.

FIGS. 3 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Exemplary embodiments of the present disclosure will be described herein below with reference to the accompanying drawings. The present disclosure provides a scheme for controlling sleep cycle synchronization when a Mobile Station (MS) fails to receive a TRF-IND (MOB_TRF-IND) message in a wireless communication system. Although a sleep mode operation control scheme of the present disclosure will be described below in the context of an IEEE 802.16m communication system, it should be understood that the sleep mode operation control scheme of the present disclosure is also applicable to other similar communication systems. Although the following description is made of a scheme for controlling a sleep mode operation by an MS and a Base Station (BS) in the BWA system, it should be understood that the sleep mode operation control scheme of the present disclosure is also applicable to the case where a plurality of MSs are present in the BWA system.

In a system according to the present disclosure, a sleep cycle change depending on the value of a TRF-IND message is as follows.

A TRF-IND message is used to notify an MS of the presence of downlink data traffic. If 'Positive Traffic Indication' is included in the TRF-IND message, the next sleep cycle is reset to the initial sleep cycle. On the other hand, if 'Negative Traffic Indication' is included in the TRF-IND message, the next sleep cycle increases by two times the previous sleep cycle. Also, if the MS transmits an uplink data traffic or a bandwidth request, the next sleep cycle is reset to the initial sleep cycle. When the next sleep cycle is reset, the next sleep cycle may be reset to a predetermined length different from that of the initial sleep cycle. For example, the predetermined length may be an integer multiple of the length of the initial sleep cycle.

According to the present disclosure, a BS and an MS exchange TRF_IND-REQ/RSP messages to exchange not only sleep cycle synchronization information but also emergency alert service-related information. Exemplary embodiments of the exchange of the emergency alert service-related information are as follows.

The BS transmits an AAI_TRF-IND-RSP message in response to an AAI_TRF-IND-REQ message received from the MS. Herein, the AAI-TRF-IND-REQ message may be replaced with a header having the same purpose. For example, the AAI_TRF-IND-REQ message may be replaced with a Sleep Control Header (SCH) or a Sleep Control Extended Header (SCEH). The AAI-TRF-IND-RSP message may also be replaced with a header having the same purpose. For example, the AAI_TRF-IND-RSP message may be replaced with a Sleep Control Header (SCH) or a Sleep Control Extended Header (SCEH).

In an exemplary embodiment of the present disclosure, the AAI_TRF_IND-RSP message may be configured as shown in Table 4 below.

TABLE 4

| Field | Size (bit) | Value/Description |
|---|---|---|
| AAI-TRF_IND-RSP message_format( ) { | | |
| Frame_Number | 10 | The least significant 10 bits of the frame number in which incoming LW will start 0~1023 |
| Sleep Cycle Length | 10 | The length of sleep Cycle which contains the next scheduled Listening Window. If the AMS receives the negative traffic indication during the next scheduled Listening Window, the (current) Sleep Cycle shall be set to this value at that time. Value: 0~1023 Sleep Cycle Length = Value + 1 |
| Emergency alert Indication | 1 | This indicates the presence of emergency information for supporting the emergency alert service before frame bye specified by 'frame Number' |
| } | | |

In Table 4, if an emergency alert service-related message will be transmitted until a frame indicated by the TRF-IND-RSP message, that is, until the start of a next scheduled listening window, an 'Emergency Alert Indication' field is set to '1' to notify the MS of the transmission of the emergency alert service-related message. When receiving the 'Emergency Alert Indication' field set to '1', the MS maintains an awake state until the next scheduled listening window and waits to receive the emergency alert service-related message. After receiving the emergency alert service-related message, the MS may perform a normal sleep mode operation, that is, may return to a sleep state until the next scheduled listening window.

In another exemplary embodiment of the present disclosure, the AAI_TRF-IND-RSP message may be configured as shown in Table 5 below.

TABLE 5

| Field | Size (bit) | Value/Description |
|---|---|---|
| AAI-TRF_IND-RSP message_format( ) { | | |
| Frame_Number | 10 | The least significant 10 bits of the frame number in which incoming LW will start 0~1023 |
| Sleep Cycle Length | 10 | The length of sleep Cycle which contains the next scheduled Listening Window. If the AMS receives the negative traffic indication during the next scheduled Listening Window, the (current) Sleep Cycle shall be set to this value at that time. Value: 0~1023 Sleep Cycle Length = Value + 1 |
| Emergency alert Indication | 1 | This indicates the presence of emergency information for supporting the emergency alert service before frame bye specified by 'frame Number' |

TABLE 5-continued

| Field | Size (bit) | Value/Description |
|---|---|---|
| If(Emergency alert Indication == 1) { Frame_Number for Emergency alert Service Message | 10 | This indicates the presence of emergency information for supporting the emergency alert service before frame bye specified by 'frame Number'. The least significant 10 bits of the frame number in which message containing Emergency alert Service information will be transmitted 0~1023 |
| } } | | |

In Table 5, if an emergency alert service-related message will be transmitted until a frame indicated by the TRF-IND-RSP message, that is, until the start of a next scheduled listening window, an 'Emergency Alert Indication' field is set to '1' to notify the MS of the transmission of the emergency alert service-related message.

In Table 5, if an emergency alert service-related message will be transmitted until a frame indicated by the AAI_TRF-IND-RSP message, that is, until the start of a next scheduled listening window, an 'Frame_Number for Emergency alert Service Message' field is used to indicate a transmission time point of the transmission of the emergency alert service-related message.

When receiving the 'Frame_Number' for Emergency alert Service Message' field set to a certain frame number, the MS may operate in a sleep state until a frame indicated by the 'Frame_Number for Emergency alert Service Message' field and may temporarily operation in an awake state to receive the emergency alert service-related message. After receiving the emergency alert service-related message, the MS may perform a normal sleep mode operation, that is, may return to a sleep state until the next scheduled listening window.

According to some embodiments of the present disclosure, only the 'Frame_Number' for Emergency alert Service Message' field may be used without the 'Emergency alert Indication' in the AAI_TRF-IND-RSP message of Table 5. Herein, if the 'Frame_Number for Emergency alert Service Message' field is not included, it means that the emergency alert service-related message will not be transmitted until the start of the next scheduled listening window. This assumes that the MS can determine the presence/absence of the 'Frame_Number for Emergency alert Service Message' field. For example, the MS can determine the inclusion/non-inclusion of a relevant parameter according to the ASN.1 encoding rule. That is, according to a document created by ASN.1 PER (Packing Encoding Rule) encoding rule, even when an indication parameter is not defined, an entity performing ASN.1 PER encoding/decoding can determine the presence/absence of other parameters such as a 'Frame_Number for Emergency alert Service Message' parameter. That is, as can be seen from a 'Type' field of TLV (Type Length Value) defined in the ASN.1 BER (Basic Encoding Rule), the entity can determine the presence/absence of a certain parameter.

In the process of repeating an awake state and a sleep state in a sleep mode according to a sleep cycle, if the MS fails to receive a TRF-IND message, the present disclosure controls the synchronization between the BS and the MS with respect to the sleep state and the awake state. Hereinafter, with reference to the accompanying drawings, a detailed description will be given of the configurations and operations of the BS and the MS for indicating the presence/absence of an emergency alert service during the synchronization control process.

Figure 3:
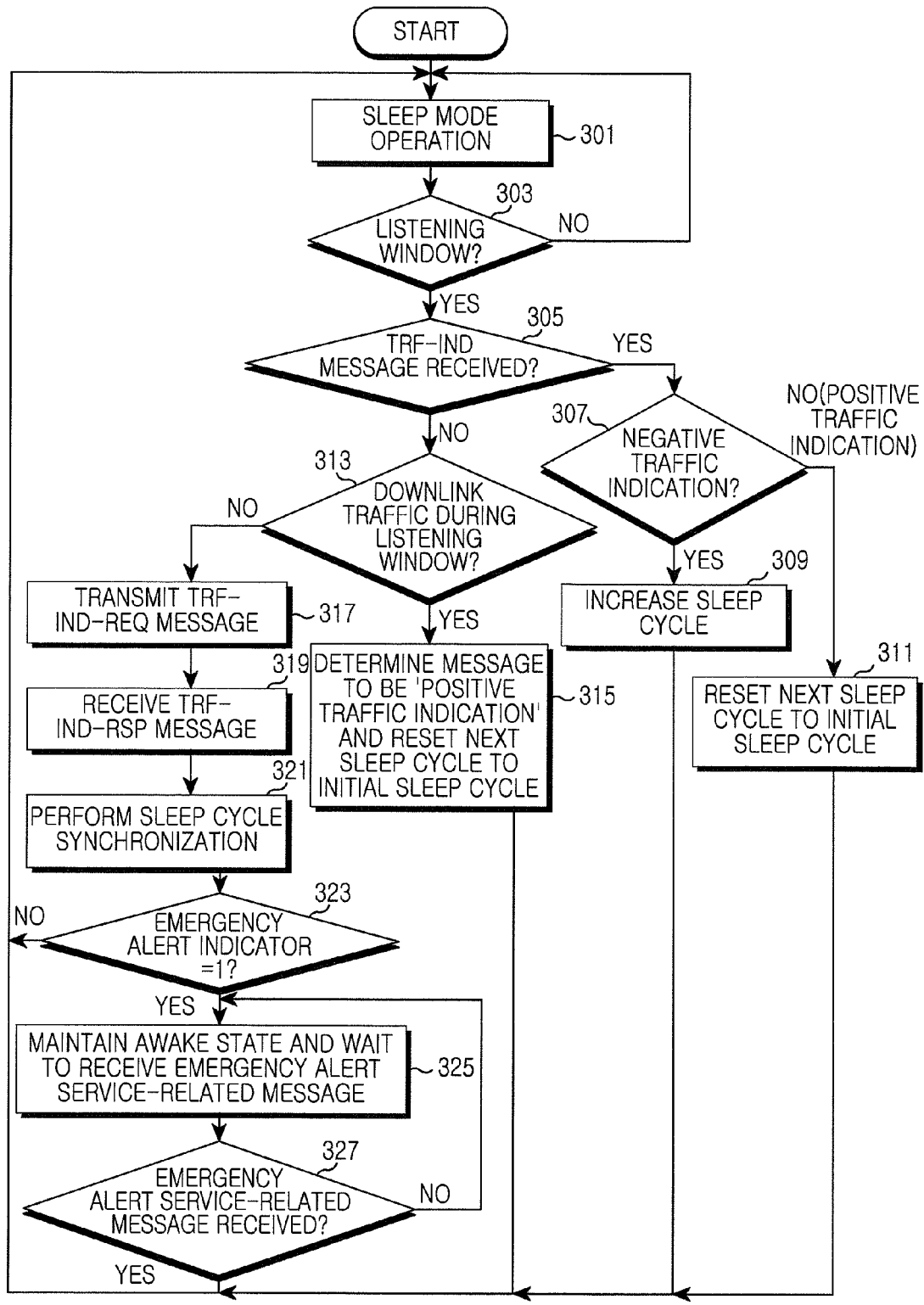
FIG. 3 illustrates an operation process of a MS for controlling sleep cycle synchronization in a BWA system according to the present disclosure.

FIG. 3 illustrates a flow diagram illustrating an operation process of an MS for controlling sleep cycle synchronization in a BWA system according to the present disclosure.

Referring to FIG. 3, the MS operates in a sleep mode in step 301. During the sleep mode operation, in step 303, the MS determines whether a listening window arrives according to a sleep cycle. If the listening window does not arrive, the MS returns to step 301 and maintains the sleep state.

On the other hand, if the listening window arrives, the MS proceeds to step 305. In step 305, the MS waits to receive a TRF-IND message during the listening window. The TRF-IND message uses the presence/absence of an MS identifier to indicate the presence/absence of downlink traffic of the MS.

If the TRF-IND message is received, the MS proceeds to step 307. In step 307, the MS determines whether the TRF-IND message represents 'Negative Traffic Indication' or 'Positive Traffic Indication'. Whether the TRF-IND message represents 'Negative Traffic Indication' or 'Positive Traffic Indication' is determined according to whether identifier information of the MS is included in the TRF-IND message. That is, if the identifier information is included, the TRF-IND message represents the 'Positive Traffic Indication'; and if the identifier information is not included, the TRF-IND message represents the 'Negative Traffic Indication'.

If the TRF-IND message represents 'Negative Traffic Indication', the MS proceeds to step 309. In step 309, the MS increases the next sleep cycle by two times the current sleep cycle. For example, if the length of the current sleep cycle is four frames, the length of the next sleep cycle is 8 frames. That is, the BS includes 'Negative Traffic Indication' in the TRF-IND message and sets the next sleep cycle of the MS to two times the current sleep cycle. Accordingly, the MS detects 'Negative Traffic Indication' and sets the next sleep cycle to two times the current sleep cycle. Accordingly, the MS and the BS implicitly synchronize the sleep cycle.

On the other hand, if the TRF-IND message represents 'Positive Traffic Indication', the MS proceeds to step 311. In step 311, the MS resets the next sleep cycle to the length of the initial sleep cycle. That is, the BS includes 'Positive Traffic Indication' in the TRF-IND message and sets the next sleep cycle of the MS to the initial sleep cycle. Accordingly, the MS detects 'Positive Traffic Indication' and sets the next sleep cycle to the initial sleep cycle. Accordingly, the MS and the BS implicitly synchronize the sleep cycle.

If the TRF-IND message is not received in step 305, the MS proceeds to step 313. In step 313, the MS determines whether downlink traffic is received during the remaining listening window. Herein, due to the non-reception of the TRF-IND, the MS cannot determine whether to increase the length of the next sleep cycle by two times or to reset the next sleep cycle to the length of the initial sleep cycle. Thus, in this example, the BS and the MS may operate according to different sleep cycles.

Even failing to receive the TRF-IND message, by determining whether downlink traffic is received during the remaining listening window in step 307, the MS can infer whether the TRF-IND message represents 'Positive Traffic Indication' or 'Negative Traffic Indication'. That is, if the downlink traffic is received during the remaining listening window, it means that the TRF-IND message has represented 'Positive Traffic Indication'; and if the downlink traffic is not received during the remaining listening window, it means that the TRF-IND message has represented 'Negative Traffic Indication'.

If the downlink traffic is received during the remaining listening window, the MS proceeds to step 315. In step 315, the MS determines that the TRF-IND message has represented 'Positive Traffic Indication', and resets the length of the next sleep cycle to the length of the initial sleep cycle.

On the other hand, if the downlink traffic is not received during the remaining listening window, the MS proceeds to step 317. In step 317, the MS transmits a TRF-IND-REQ message to notify the BS that the TRF-IND message was not received in the listening window of step 305.

The example where the downlink traffic is not received corresponds to the example where the downlink traffic was not transmitted, that is, the example where the TRF-IND message represents 'Negative Traffic Indication', or the example where the downlink traffic fails to be received due to channel state degradation even if the downlink traffic was transmitted. If the downlink traffic was not transmitted, the MS may set the next sleep cycle to two times the current sleep cycle. In this example, the MS need not transmit a TRF-IND-REQ message. On the other hand, if the downlink traffic fails to be received due to channel state degradation, the MS determines that the TRF-IND message represents 'Negative Traffic Indication', and sets the next sleep cycle to two times the current sleep cycle, thus causing sleep cycle desynchronization between the MS and the BS. Therefore, in order to prevent the sleep cycle desynchronization, the MS transmits the TRF-IND-REQ message to the BS to remove uncertainty as to whether the TRF-IND message represents 'Positive Traffic Indication' or 'Negative Traffic Indication'. According to another exemplary embodiment of the present disclosure, the MS may inquire a start time point of the next listening window, instead of the information about whether the TRF-IND message represents 'Positive Traffic Indication' or 'Negative Traffic Indication', and synchronize the start time point of an uncertain sleep cycle. For example, the TRF-IND-REQ message may be configured as shown in Table 6 below.

TABLE 6

| Field | Size (bit) | Value/Description |
|---|---|---|
| AAI-TRF_IND-REQ message_format( ) { | | |
| Control Message Type | 8 | This indicates type of control message is AAI-TRF_IND-REQ message |

Thereafter, in step 319, the MS receives a TRF-IND-RSP message as a response to the TRF-IND-REQ message. For example, the TRF-IND-RSP message may be configured as shown in Table 4. Accordingly, the MS detects the start time point of the next listening window from a 'Frame_Number' field of the TRF-IND-REQ message, and detects the length of a sleep cycle including the next scheduled listening window from 'Sleep Cycle Length'. Also, the MS detects an emergency alert service-related message transmitted using an 'Emergency alert Indication' field. Herein, the TRF-IND-RSP message is transmitted from the BS according to a unicast scheme.

In step 321, the MS performs sleep cycle synchronization by using the start time point of the next listening window and the length of a sleep cycle including the next scheduled listening window. That is, the MS sets the length of the next sleep cycle to the length of a sleep cycle including the next scheduled listening window, and starts the next sleep cycle from the start time point of the next listening window.

In step 323, the MS determines whether the 'Emergency alert Indication' field is set to '1'. In other words, the MS determines whether the 'Emergency alert Indication' field is set to a value indicating the transmission of the emergency alert service-related message. If the 'Emergency alert Indication' field is set to '0', the MS returns to step 301 and operates according to the sleep mode.

On the other hand, if the 'Emergency alert Indication' field is set to '1', the MS proceeds to step 325. In step 325, the MS maintains the awake state and waits to receive the emergency alert service-related message. That is, if the 'Emergency alert Indication' field is set to '1', because it means that the emergency alert service-related message will be transmitted from the BS before the arrival of the next scheduled listening window, the MS does not return to the sleep state until the arrival of the next scheduled listening window, but maintains the awake state and waits to receive the emergency alert service-related message.

In step 327, the MS determines whether the emergency alert service-related message is received. If the emergency alert service-related message is received, the MS returns to step 301 and operates according to the sleep cycle of the sleep mode. In other words, the MS operates according to the sleep window and the listening window of the sleep cycle synchronized in step 321. That is, if the next scheduled listening window does not arrive, the MS enters the sleep state; and when the next scheduled listening window arrives, the MS attempts to receive a TRF-IND message and downlink traffic.

Figure 4:
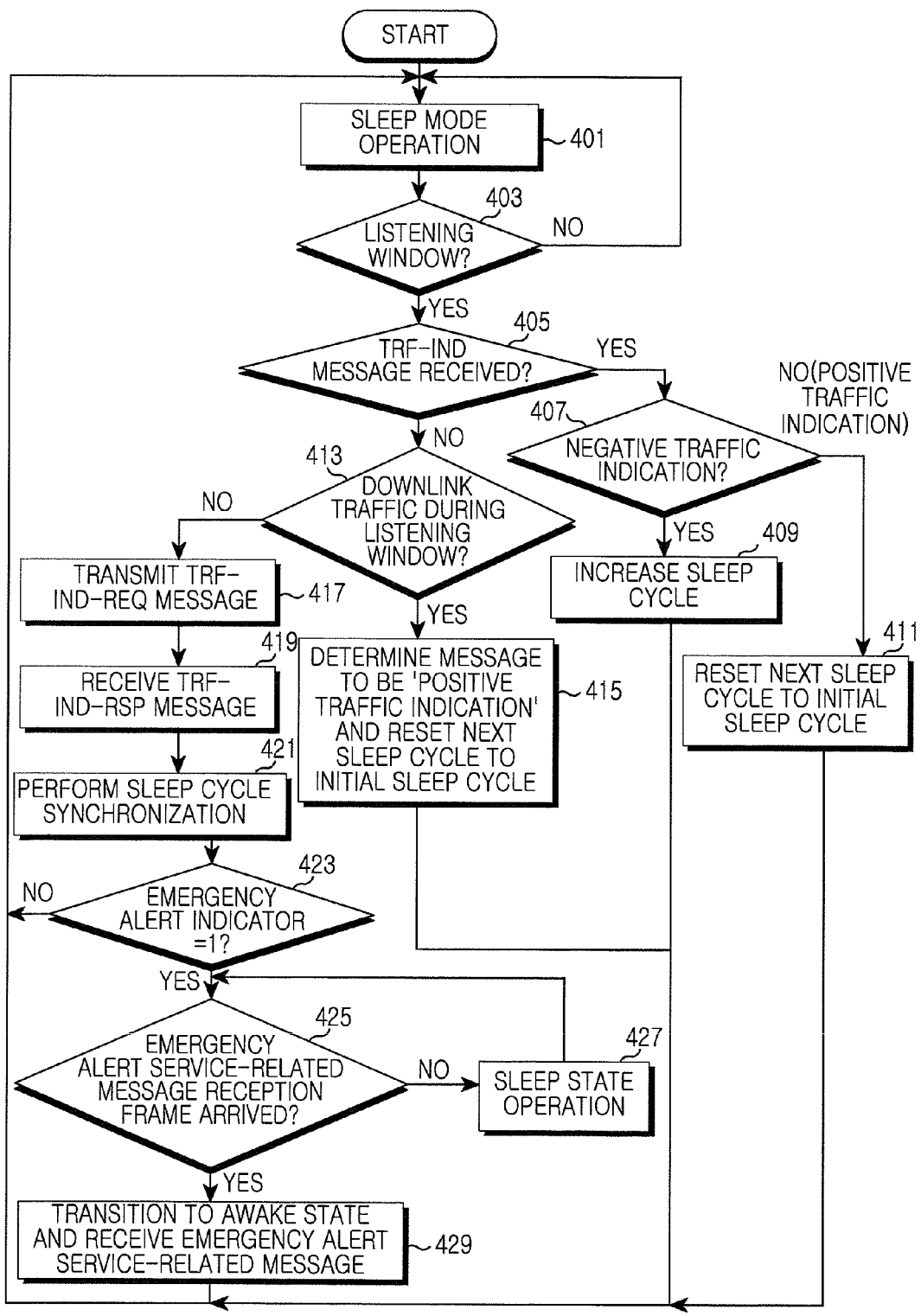
FIG. 4 illustrates an operation process of an MS for controlling sleep cycle synchronization in a BWA system according to the present disclosure.

FIG. 4 illustrates a flow diagram illustrating an operation process of an MS for controlling sleep cycle synchronization in a BWA system according to the present disclosure.

Referring to FIG. 4, the MS operates in a sleep mode in step 401. During the sleep mode operation, in step 403, the MS determines whether a listening window arrives according to a sleep cycle. If the listening window does not arrive, the MS returns to step 401 and maintains the sleep state.

On the other hand, if the listening window arrives, the MS proceeds to step 405. In step 405, the MS waits to receive a TRF-IND message during the listening window. The TRF-IND message uses the presence/absence of an MS identifier to indicate the presence/absence of downlink traffic of the MS.

If the TRF-IND message is received, the MS proceeds to step 407. In step 407, the MS determines whether the TRF-IND message represents 'Negative Traffic Indication' or 'Positive Traffic Indication'. Whether the TRF-IND message represents 'Negative Traffic Indication' or 'Positive Traffic Indication' is determined according to whether identifier information of the MS is included in the TRF-IND message. That is, if the identifier information is included, the TRF-IND message represents the 'Positive Traffic Indication'; and if the identifier information is not included, the TRF-IND message represents the 'Negative Traffic Indication'.

If the TRF-IND message represents 'Negative Traffic Indication', the MS proceeds to step 309. In step 309, the MS increases the next sleep cycle by two times the current sleep cycle. For example, if the length of the current sleep cycle is four frames, the length of the next sleep cycle is 8 frames. That is, the BS includes 'Negative Traffic Indication' in the TRF-IND message and sets the next sleep cycle of the MS to two times the current sleep cycle. Accordingly, the MS detects 'Negative Traffic Indication' and sets the next sleep cycle to two times the current sleep cycle. Accordingly, the MS and the BS implicitly synchronize the sleep cycle.

On the other hand, if the TRF-IND message represents 'Positive Traffic Indication', the MS proceeds to step 411. In step 411, the MS resets the next sleep cycle to the length of the initial sleep cycle. That is, the BS includes 'Positive Traffic Indication' in the TRF-IND message and sets the next sleep cycle of the MS to the initial sleep cycle. Accordingly, the MS detects 'Positive Traffic Indication' and sets the next sleep cycle to the initial sleep cycle. Accordingly, the MS and the BS implicitly synchronize the sleep cycle.

If the TRF-IND message is not received in step 405, the MS proceeds to step 413. In step 413, the MS determines whether downlink traffic is received during the remaining listening window. Herein, due to the non-reception of the TRF-IND, the MS cannot determine whether to increase the length of the next sleep cycle by two times or to reset the next sleep cycle to the length of the initial sleep cycle. Thus, in this example, the BS and the MS may operate according to different sleep cycles.

Even failing to receive the TRF-IND message, by determining whether downlink traffic is received during the remaining listening window in step 407, the MS can infer whether the TRF-IND message represents 'Positive Traffic Indication' or 'Negative Traffic Indication'. That is, if the downlink traffic is received during the remaining listening window, it means that the TRF-IND message has represented 'Positive Traffic Indication'; and if the downlink traffic is not received during the remaining listening window, it means that the TRF-IND message has represented 'Negative Traffic Indication'.

If the downlink traffic is received during the remaining listening window, the MS proceeds to step 415. In step 415, the MS determines that the TRF-IND message has represented 'Positive Traffic Indication', and resets the length of the next sleep cycle to the length of the initial sleep cycle.

On the other hand, if the downlink traffic is not received during the remaining listening window, the MS proceeds to step 417. In step 417, the MS transmits a TRF-IND-REQ message to notify the BS that the TRF-IND message was not received in the listening window of step 405.

The example where the downlink traffic is not received corresponds to the example where the downlink traffic was not transmitted, that is, the example where the TRF-IND message represents 'Negative Traffic Indication', or the example where the downlink traffic fails to be received due to channel state degradation even if the downlink traffic was transmitted. If the downlink traffic was not transmitted, the MS may set the next sleep cycle to two times the current sleep cycle. In this example, the MS need not transmit a TRF-IND-REQ message. On the other hand, if the downlink traffic fails to be received due to channel state degradation, the MS determines that the TRF-IND message represents 'Negative Traffic Indication', and sets the next sleep cycle to two times the current sleep cycle, thus causing sleep cycle desynchronization between the MS and the BS. Therefore, in order to prevent the sleep cycle desynchronization, the MS transmits the TRF-IND-REQ message to the BS to remove uncertainty as to whether the TRF-IND message represents 'Positive Traffic Indication' or 'Negative Traffic Indication'. According to some embodiments of the present disclosure, the MS may inquire a start time point of the next listening window, instead of the information about whether the TRF-IND message represents 'Positive Traffic Indication' or 'Negative Traffic Indication', and synchronize the start time point of an uncertain sleep cycle. For example, the TRF-IND-REQ message may be configured as shown in Table 6.

Thereafter, in step 419, the MS receives a TRF-IND-RSP message as a response to the TRF-IND-REQ message. For example, the TRF-IND-RSP message may be configured as shown in Table 5. Accordingly, the MS detects the start time point of the next listening window from a 'Frame_Number' field of the TRF-IND-REQ message, and detects the length of a sleep cycle including the next scheduled listening window from 'Sleep Cycle Length'. Also, the MS detects the whether an emergency alert service-related message is transmitted by using an 'Emergency alert Indication' field, and detects the transmission time point of the emergency alert service-related message from the 'Frame_Number for Emergency alert Service Message' field. Herein, the TRF-IND-RSP message is transmitted from the BS according to a unicast scheme.

In step 421, the MS performs sleep cycle synchronization by using the start time point of the next listening window and the length of a sleep cycle including the next scheduled listening window. That is, the MS sets the length of the next sleep cycle to the length of a sleep cycle including the next scheduled listening window, and starts the next sleep cycle from the start time point of the next listening window.

In step 423, the MS determines whether the 'Emergency alert Indication' field is set to '1'. In other words, the MS determines whether the 'Emergency alert Indication' field is set to a value indicating the transmission of the emergency alert service-related message. If the 'Emergency alert Indication' field is set to '0', the MS returns to step 401 and operates according to the sleep mode.

On the other hand, if the 'Emergency alert Indication' field is set to '1', the MS proceeds to step 425. In step 425, the MS determines whether a frame for reception of the emergency alert service-related message (hereinafter referred to as the emergency alert service-related message reception frame) has arrived. In other words, the MS determines whether a frame indicated by the 'Frame_Number for Emergency alert Service Message' field has arrived.

If the emergency alert service-related message reception frame has not arrived, the MS proceeds to step 427 and maintains the sleep state. In other words, the MS operates according to the sleep window and the listening window of the sleep cycle synchronized in step 421. Herein, while operating in the sleep state in the sleep mode, the MS proceeds to step 425 and continues to determine whether the emergency alert service-related message reception frame has arrived.

On the other hand, if the emergency alert service-related message reception frame has arrived, the MS proceeds to step 429. In step 429, the MS transitions to the awake state and receives the emergency alert service-related message. Thereafter, the MS returns to step 401 and operates according to the sleep mode. In other words, the MS operates according to the sleep window and the listening window of the sleep cycle synchronized in step 421. That is, if the next scheduled listening window does not arrive, the MS enters the sleep state; and when the next scheduled listening window arrives, the MS attempts to receive a TRF-IND message and downlink traffic.

In the embodiments described with reference to FIG. 4, the MS determines in step 423 whether the 'Emergency alert Indication' field is set to '1'. However, according to various embodiments of the present disclosure, the TRF-IND-RSP message may include the 'Frame_Number for Emergency alert Service Message' field as emergency alert service-related information, without including the 'Emergency alert Indication' field. In this example, step 423 is replaced with the step of determining the presence/absence of the 'Frame_Number for Emergency alert Service Message' field. That is, the MS determines the presence/absence of the 'Frame_Number for Emergency alert Service Message' field in step 423, returns to step 401 in the example of the absence of the 'Frame_Number for Emergency alert Service Message' field, and proceeds to step 425 in the example of the presence of the 'Frame_Number for Emergency alert Service Message' field.

Figure 5:
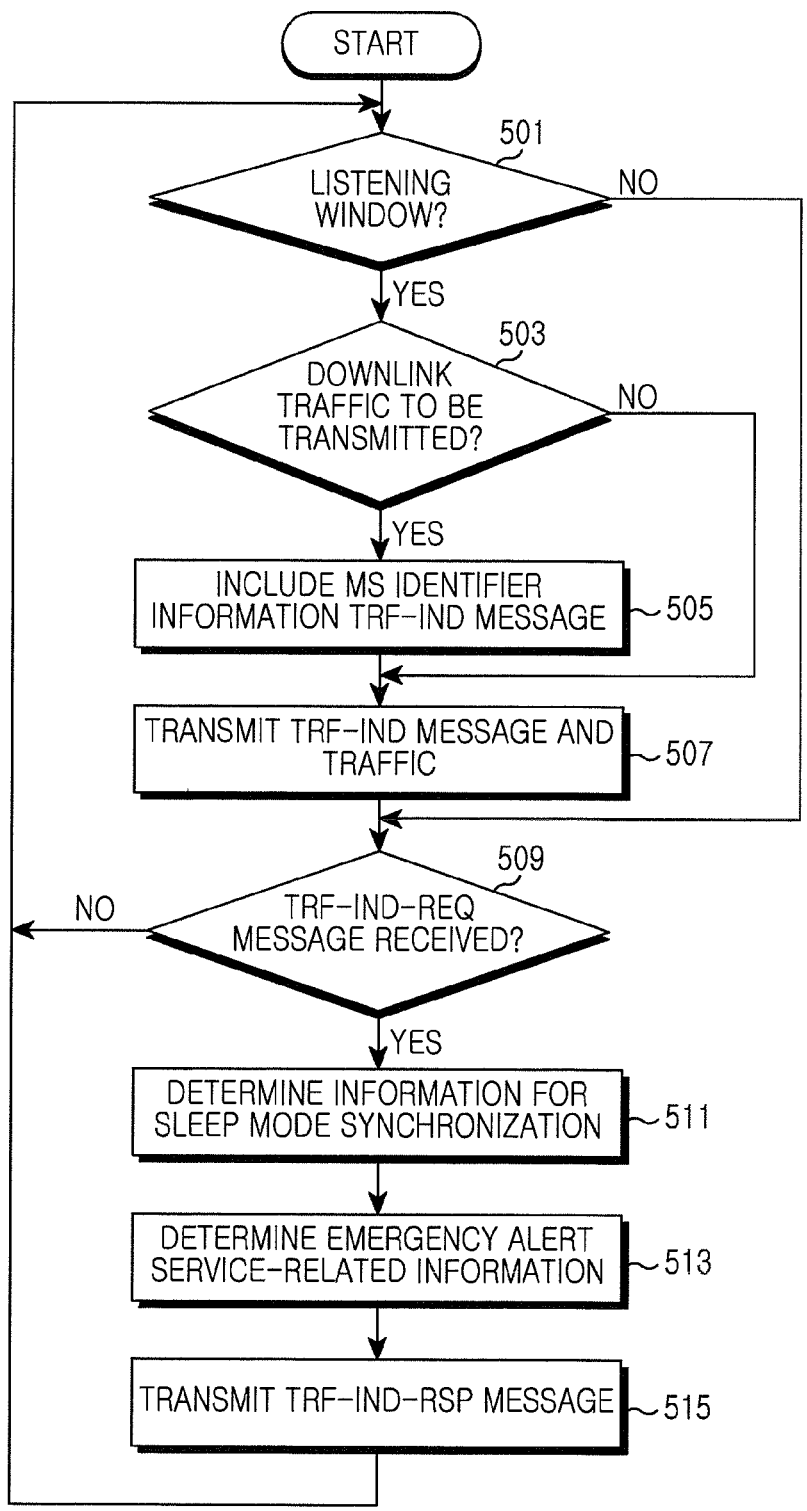
FIG. 5 illustrates an operation process of a BS for controlling sleep cycle synchronization in a BWA system according to the present disclosure.

FIG. 5 illustrates a flow diagram illustrating an operation process of a BS for controlling sleep cycle synchronization in a BWA system according to the present disclosure.

Referring to FIG. 5, in step 501, the BS determines whether a listening window of an MS has arrived. If the listening window has arrived, the BS proceeds to step 503. In step 503, the BS determines whether there is downlink traffic to be transmitted to the MS.

If there is downlink traffic to be transmitted to the MS, the BS proceeds to step 505. In step 505, the BS includes identifier information of the MS in a TRF-IND message. When the identifier information of the MS is included in the TRF-IND message, the TRF-IND message is determined as 'Positive Traffic Indication' by the MS. On the other hand, if there is no downlink traffic to be transmitted to the MS, the BS does not perform step 505. Accordingly, the MS determines whether the TRF-IND message is 'Negative Traffic Indication' or 'Positive Traffic Indication', on the basis of information about whether the identifier information of the MS is included in the TRF-IND message.

Thereafter, in step 507, the BS transmits the TRF-IND message including at least one MS identifier and downlink traffic of the MS. Herein, the transmission of the downlink traffic of the MS may be omitted according to the determination result of step 503.

In step 509, the BS determines whether a TRF-IND-REQ message is received from the MS. The TRF-IND-REQ message is used to request information for sleep mode synchronization. For example, the TRF-IND-REQ message may be configured as shown in Table 6.

If the TRF-IND-REQ message is received from the MS, the BS proceeds to step 511. In step 511, the BS determines information for sleep mode synchronization (hereinafter referred to as sleep mode synchronization information). The sleep mode synchronization information includes the start time point of the next listening window and the length of a sleep cycle including the next scheduled listening window.

Thereafter, in step 513, the BS determines emergency alert service-related information. The emergency alert service-related information includes at least one of information indicating the whether an emergency alert service-related message is transmitted and information indicating the transmission time point of the emergency alert service-related message.

Thereafter, in step 515, the BS transmits a TRF-IND-RSP message containing the sleep mode synchronization information to the MS. Herein, the TRF-IND-RSP message is transmitted from the BS according to a unicast scheme. For example, the TRF-IND-RSP message may be configured as shown in Table 4 or Table 5. According to various embodiments of the present disclosure, as shown in Table 4, the TRF-IND-RSP message may include a 'Frame_Number' field indicating the start time point of the next listening window, a 'Sleep Cycle Length' field indicating the length of a sleep cycle including the next scheduled listening window, and an 'Emergency alert Indication' field indicating the whether an emergency alert service-related message is transmitted. According to some embodiments of the present disclosure, the TRF-IND-RSP message may include a 'Frame_Number' field indicating the start time point of the next listening window, a 'Sleep Cycle Length' field indicating the length of a sleep cycle including the next scheduled listening window, an 'Emergency alert Indication' field indicating the whether an emergency alert service-related message is transmitted, and a 'Frame_Number for Emergency alert Service Message' field indicating the transmission time point of the emergency alert service-related message.

In the embodiments described with reference to FIGS. 4 to 5, the MS transmits the TRF-IND-REQ message. However, according to some embodiments of the present disclosure, the TRF-IND-REQ message may be an independent signaling message designed for a separate function. For example, the independent signaling message may mean 'Sleep Sync Info Request'. According to some embodiments of the present disclosure, the MS may transmit CQICH (Channel Quality Indication CHannel), dedicated CDMA (Code Division Multiple Access) code, or a special code specialized for the synchronization, instead of the TRF-IND-REQ/RSP message.

Figure 6:
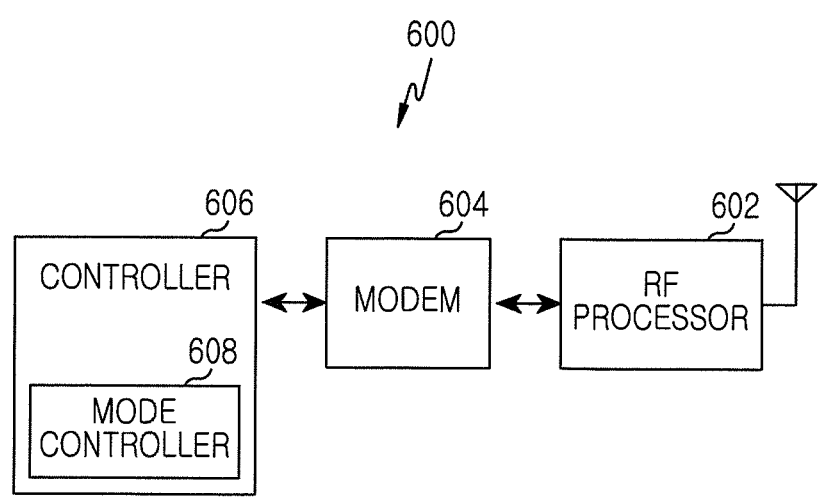
FIG. 6 illustrates a block diagram of an MS in a BWA system according to the present disclosure.

FIG. 6 illustrates a block diagram of an MS in a BWA system according to the present disclosure.

Referring to FIG. 6, the MS 600 includes a Radio Frequency (RF) processor 602, a modem 604, and a controller 606.

The RF processor 602 performs functions for transmission/reception of signals through a radio channel, such as signal band conversion and signal amplification. The RF processor 602 up-converts a baseband signal, received from the modem 604, into an RF signal and transmits the RF signal through an antenna. Also, the RF processor 602 down-converts an RF signal, received through the antenna, into a baseband signal.

The modem 604 performs a baseband signal/bit stream conversion function according to the physical layer standard of the system. For example, for data transmission, the modem 604 encodes/modulates a transmission bit stream to generate complex symbols, maps the complex symbols to subcarriers, and generates OFDM symbols by Inverse Fast Fourier Transform (IFFT) and Cyclic Prefix (CP) insertion. Also, for data reception, the modem 604 divides baseband signals, received from the RF processor 602, on an OFDM symbol basis, restores signals mapped to subcarriers by FFT, and restores the received bit stream by demodulation and decoding.

The controller 606 controls an overall function of the MS 600. For example, the controller 606 generates and interprets MAC control message exchanged with a BS. The controller 606 includes a mode controller 608 for determining an operation mode of the MS 600 and performs an operation according to the determined operation mode. That is, the mode controller 608 determines whether to transition to a sleep mode according to the frequency of generation of transmission/reception traffic, and controls conversion of a sleep state and an awake state according to a listening window and a sleep window in a sleep cycle when transitioning to the sleep mode. During the sleep window of the sleep mode, the controller 606 does not perform a signal receiving operation. During the listening window of the sleep mode, the controller 606 determines the presence/absence of downlink traffic to the MS 600 through a traffic indication message received from the BS. The mode controller 608 controls the length of the sleep window according to the presence/absence of the downlink traffic. If failing to receive the traffic indication message during the listening window, the controller 606 performs the following functions in order to prevent the sleep cycle desynchronization with the BS.

If failing to receive the traffic indication message during the listening window, the controller 606 determines whether the downlink traffic is received during the remaining listening window. If the downlink traffic is received during the remaining listening window, the controller 606 determines that the traffic indication message has represented 'Positive Traffic Indication', and resets the length of the next sleep cycle to the length of the initial sleep cycle. On the other hand, if the downlink traffic is not received during the remaining listening window, the controller 606 generates a TRF-IND-REQ message and transmits the TRF-IND-REQ message to the BS through the modem 604 and the RF processor 602. That is, the controller 606 uses the TRF-IND-REQ message to notify the BS that the controller 606 has failed to receive the traffic indication message during the listening window and inquires a start time point of the next listening window and the length of a sleep cycle including the next scheduled listening window. For example, the TRF-IND-REQ message may be configured as shown in Table 6. Thereafter, if a TRF-IND-RSP message is received as a response to the TRF-IND-REQ message through the RF processor 602 and the modem 604, the controller 606 detects the start time point of the next listening window and the length of the sleep cycle including the next scheduled listening window which is contained in the TRF-IND-RSP message. Accordingly, the mode controller 608 performs sleep cycle synchronization by using the start time point of the next listening window and the length of the sleep cycle including the next scheduled listening window. That is, the mode controller 608 sets the length of the next sleep cycle to the length of the sleep cycle including the next scheduled listening window, and starts the next sleep cycle from the start time point of the next listening window.

Also, the controller 606 detects emergency alert service-related information included in the TRF-IND-RSP message. The emergency alert service-related information includes at least one of information indicating the whether an emergency alert service-related message is transmitted and information indicating the transmission time point of the emergency alert service-related message.

According to the present disclosure, if the emergency alert service-related information includes only the information indicating the whether the emergency alert service-related message is transmitted, the controller 606 determines whether the transmission of the emergency alert service-related message is present. If the transmission of the emergency alert service-related message is present, the mode controller 608 controls the MS 600 to operate in the awake state until the reception of the emergency alert service-related message.

According to some embodiments of the present disclosure, if the emergency alert service-related information includes the information indicating the whether the emergency alert service-related message is transmitted and the information indicating the transmission time point of the emergency alert service-related message, the controller 606 determines whether the transmission of the emergency alert service-related message is present. If the transmission of the emergency alert service-related message is present, the mode controller 608 controls the MS 600 to operate in the sleep mode and determines whether the emergency alert service-related message reception frame has arrived. When the emergency alert service-related message reception frame has arrived, the mode controller 608 transitions to the awake state and the controller 606 receives the emergency alert service-related message.

According to some embodiments of the present disclosure, if the emergency alert service-related information includes the information indicating the transmission time point of the emergency alert service-related message, the controller 606 determines whether the information indicating the transmission time point of the emergency alert service-related message is present. If the information indicating the transmission time point of the emergency alert service-related message is present, the mode controller 608 controls the MS 600 to operate in the sleep mode and determines whether the emergency alert service-related message reception frame has arrived. When the emergency alert service-related message reception frame has arrived, the mode controller 608 transitions to the awake state and the controller 606 receives the emergency alert service-related message.

Figure 7:
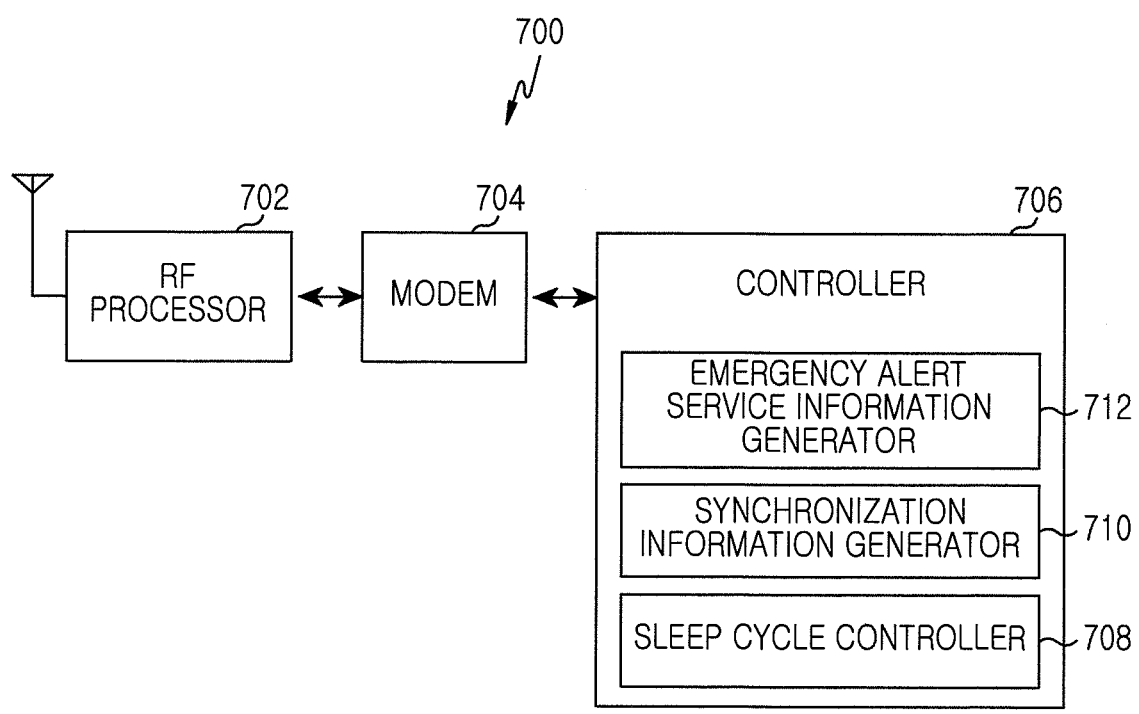
FIG. 7 illustrates a block diagram of a BS in a BWA system according to the present disclosure.

FIG. 7 illustrates a block diagram of a BS in a BWA system according to the present disclosure.

Referring to FIG. 7, the BS 700 includes an RF processor 702, a modem 704, and a controller 706.

The RF processor 702 performs functions for transmission/reception of signals through a radio channel, such as signal band conversion and signal amplification. The RF processor 702 up-converts a baseband signal, received from the modem 704, into an RF signal and transmits the RF signal through an antenna. Also, the RF processor 702 down-converts an RF signal, received through the antenna, into a baseband signal.

The modem 704 performs a baseband signal/bit stream conversion function according to the physical layer standard of the system. For example, for data transmission, the modem 704 encodes/modulates a transmission bit stream to generate complex symbols, maps the complex symbols to subcarriers, and generates OFDM symbols by IFFT and CP insertion. Also, for data reception, the modem 704 divides baseband signals, received from the RF processor 702, on an OFDM symbol basis, restores signals mapped to subcarriers by FFT, and restores the received bit stream by demodulation and decoding.

The controller 706 controls an overall function of the BS 700. For example, the controller 706 generates and interprets MAC control message exchanged with an MS. The controller 706 determines an operation mode of the MS automatically or at the request of the MS and generates a message indicating the determined operation mode. Herein, the operation mode includes a sleep mode and an active mode. The controller 706 includes a sleep cycle controller 708 for controlling a sleep cycle of at least one MS operating in the sleep mode. The sleep cycle increases or decreases according to the progress of the sleep mode, and may differ according to MSs. Also, the controller 706 generates a traffic indication message transmitted during a listening window of the MS.

The controller 706 further includes a synchronization information generator 710 for generating information that is used by the MS, which has failed to receive the traffic indication message during the listening window, to remove the sleep cycle desynchronization with the BS 700. The synchronization information generator 710 generates synchronization information when a TRF-IND-REQ message is received from the MS. Herein, the sleep mode synchronization information includes the start time point of the next listening window and the length of the sleep cycle including the next scheduled listening window. The controller 706 further includes an emergency alert service information generator 712 for information that is used by the MS, which has failed to receive the traffic indication message during the listening window, to acquire emergency alert service-related information. The emergency alert service information generator 712 generates emergency alert service-related information when a TRF-IND-REQ message is received from the MS. The emergency alert service-related information includes at least one of information indicating the whether an emergency alert service-related message is transmitted and information indicating the transmission time point of the emergency alert service-related message. Also, the controller 706 generates a TRF-IND-RSP message including the emergency alert service-related information and the synchronization information, and transmits the TRF-IND-RSP message through the modem 704 and the RF processor 702. For example, the TRF-IND-RSP message may be configured as shown in Table 4 or Table 5.

According to the configurations of the MS 600 and the BS 700 described with reference to FIGS. 6 to 7, the MS 600 transmits the TRF-IND-REQ message. However, according to some embodiments of the present disclosure, the TRF-IND-REQ message may be an independent signaling message designed for a separate function. For example, the independent signaling message may mean 'Sleep Sync Info Request'. According to various embodiments of the present disclosure, the MS 600 may transmit CQICH, dedicated CDMA code, or a special code specialized for the synchronization, instead of the TRF-IND-REQ/RSP message.

As described above, the present disclosure controls the state transition between the MS 600 and the BS 700 through the sleep control signaling in the BWA system, thereby maintaining the sleep mode synchronization even in the example of non-reception of the TRF-IND message. Also, the present disclosure transmits the emergency alert service information through the sleep control signaling, thereby enabling the MS 600 to receive the emergency alert service-related message even in the example of non-reception of the TRF-IND message.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for operating a Mobile Station (MS) in a sleep mode state in a wireless communication system, the method comprising:
responsive to failing to receive a traffic indication message and unicast data during a listening window, transmitting a request message to a Base Station (BS) to inquire a location of a next scheduled listening window;
receiving a response message that is unicasted in response to the request message;
performing sleep cycle synchronization by using synchronization information included in the response message; and
determining whether an emergency alert service-related message is transmitted by using emergency alert service-related information included in the response message.

2. The method of claim 1, wherein the emergency alert service-related information includes at least one of information indicating whether the emergency alert service-related message is transmitted and information indicating a transmission time point of the emergency alert service-related message.

3. The method of claim 2, further comprising:
responsive to the emergency alert service-related message being transmitted, maintaining an awake state and waiting to receive the emergency alert service-related message.

4. The method of claim 2, further comprising:
responsive to the emergency alert service-related message being transmitted, determining whether a frame indicated by the information indicating the transmission time point of the emergency alert service-related message arrives; and when the frame indicated by the information indicating the transmission time point of the emergency alert service-related message arrives, transitioning to an awake state and receiving the emergency alert service-related message.

5. The method of claim 2, further comprising:
determining whether the information indicating the transmission time point of the emergency alert service-related message is included;
responsive to the information indicating the transmission time point of the emergency alert service-related message being included, determining whether a frame indicated by the information indicating the transmission time point of the emergency alert service-related message arrives; and
when the frame indicated by the information indicating the transmission time point of the emergency alert service-related message arrives, transitioning to an awake state and receiving the emergency alert service-related message.

6. The method of claim 1, wherein the request message is one of an Advanced Air Interface Traffic Indication-Request (AAI TRF IND-REQ) message, a Sleep Control Header (SCH) message, and a Sleep Control Extended Header (SCEH) message.

7. The method of claim 1, wherein the response message is one of an Advanced Air Interface Traffic Indication-Response (AAI TRF IND-RSP) message, a Sleep Control Header (SCH) message, and a Sleep Control Extended Header (SCEH) message.

8. The method of claim 1, wherein the synchronization information includes at least one of a start frame number of a next scheduled listening window and a size of a sleep cycle including a next scheduled listening window.

9. The method of claim 8, wherein the size of the next scheduled sleep cycle indicates a length of a sleep cycle including a next scheduled listening window corresponding to a doubled sleep cycle.

10. A method for operating a Base Station (BS) in a wireless communication system, comprising:
transmitting downlink traffic and a traffic indication message including at least one Mobile Station (MS) identifier during a listening window of at least one MS;
receiving a request message to inquire a location of a next scheduled listening window, from an MS failing to receive a traffic indication message, and unicast data during a listening window; and
unicasting a response message including synchronization information and emergency alert service-related information to the MS to respond to the request message of the MS.

11. The method of claim 10, wherein the emergency alert service-related information includes at least one of information indicating whether the emergency alert service-related message is transmitted and information indicating a transmission time point of the emergency alert service-related message.

12. The method of claim 10, wherein the request message is one of an Advanced Air Interface Traffic Indication-Request (AAI TRF IND-REQ) message, a Sleep Control Header (SCH) message, and a Sleep Control Extended Header (SCEH) message.

13. The method of claim 10, wherein the response message is one of an Advanced Air Interface Traffic Indication-Response (AAI TRF IND-RSP) message, a Sleep Control Header (SCH) message, and a Sleep Control Extended Header (SCEH) message.

14. The method of claim 10, wherein the synchronization information includes at least one of a start frame number of a next scheduled listening window and a size of a sleep cycle including a next scheduled listening window.

15. The method of claim 14, wherein the size of the next scheduled sleep cycle indicates a length of a sleep cycle including a next scheduled listening window corresponding to a doubled sleep cycle.

16. An apparatus of a Mobile Station (MS) in a wireless communication system, comprising:
a modem configured to transmit, responsive to failing to receive a traffic indication message and unicast data during a listening window, a request message to a Base Station (BS) to inquire a location of a next scheduled listening window, and receive a response message that is unicasted in response to the request message; and
a controller configured to perform sleep cycle synchronization by using synchronization information included in the response message, and determine whether an emergency alert service-related message is transmitted by using emergency alert service-related information included in the response message.

17. The apparatus of claim 16, wherein the emergency alert service-related information includes at least one of information indicating whether the emergency alert service-related message is transmitted and information indicating a transmission time point of the emergency alert service-related message.

18. The apparatus of claim 17, wherein responsive to the emergency alert service-related message being transmitted, the controller is further configured to maintain an awake state and waits to receive the emergency alert service-related message.

19. The apparatus of claim 17, wherein the controller is further configured to determine whether a frame indicated by the information indicating the transmission time point of the emergency alert service-related message arrives in responsive to the emergency alert service-related message being transmitted; and transition to an awake state to receive the emergency alert service-related message, when the frame indicated by the information indicating the transmission time point of the emergency alert service-related message arrives.

20. The apparatus of claim 17, wherein the controller is further configured to determine whether the information indicating the transmission time point of the emergency alert service-related message is included; determine whether a frame indicated by the information indicating the transmission time point of the emergency alert service-related message arrives in responsive to the information indicating the transmission time point of the emergency alert service-related message being included; and transition to an awake state to receive the emergency alert service-related message, when the frame indicated by the information indicating the transmission time point of the emergency alert service-related message arrives.

21. The apparatus of claim 16, wherein the request message is one of an Advanced Air Interface Traffic Indication-Request (AAI TRF IND-REQ) message, a Sleep Control Header (SCH) message, and a Sleep Control Extended Header (SCEH) message.

22. The apparatus of claim 16, wherein the response message is one of an Advanced Air Interface Traffic Indication-Response (AAI TRF IND-RSP) message, a Sleep Control Header (SCH) message, and a Sleep Control Extended Header (SCEH) message.

23. The apparatus of claim 16, wherein the synchronization information includes at least one of a start frame number of a next scheduled listening window and a size of a sleep cycle including a next scheduled listening window.

24. The apparatus of claim 23, wherein the size of the next scheduled sleep cycle indicates a length of a sleep cycle including a next scheduled listening window corresponding to a doubled sleep cycle.

25. An apparatus of a Base Station (BS) in a wireless communication system, comprising:
 a modem configured to transmit downlink traffic and a traffic indication message including at least one Mobile Station (MS) identifier during a listening window of at least one MS, and receive a request message to inquire a location of a next scheduled listening window, from an MS failing to receive a traffic indication message, and unicast data during a listening window; and
 a controller configured to respond to the request message of the MS by unicasting a response message including synchronization information and emergency alert service-related information to the MS.

26. The apparatus of claim 25, wherein the emergency alert service-related information includes at least one of information indicating whether the emergency alert service-related message is transmitted and information indicating a transmission time point of the emergency alert service-related message.

27. The apparatus of claim 25, wherein the request message is one of an Advanced Air Interface Traffic Indication-Request (AAI TRF IND-REQ) message, a Sleep Control Header (SCH) message, and a Sleep Control Extended Header (SCEH) message.

28. The apparatus of claim 25, wherein the response message is one of an Advanced Air Interface Traffic Indication-Response (AAI TRF IND-RSP) message, a Sleep Control Header (SCH) message, and a Sleep Control Extended Header (SCEH) message.

29. The apparatus of claim 25, wherein the synchronization information includes at least one of a start frame number of a next scheduled listening window and a size of a sleep cycle including a next scheduled listening window.

30. The apparatus of claim 29, wherein the size of the next scheduled sleep cycle indicates a length of a sleep cycle including a next scheduled listening window corresponding to a doubled sleep cycle.

* * * * *